(12) United States Patent
Johnston

(10) Patent No.: US 6,390,158 B2
(45) Date of Patent: May 21, 2002

(54) POST VALVE YOKE

(75) Inventor: Ronald Johnston, Wellington, OH (US)

(73) Assignee: Superior Products, Inc.

( * ) Notice: Subject to any disclaimer, the term of this patent is extended or adjusted under 35 U.S.C. 154(b) by 0 days.

(21) Appl. No.: 09/838,762

(22) Filed: Apr. 19, 2001

Related U.S. Application Data

(60) Provisional application No. 60/198,978, filed on Apr. 21, 2000.

(51) Int. Cl.[7] .................................................. B65B 3/00
(52) U.S. Cl. ........................................ 141/383; 141/386
(58) Field of Search ........................... 141/18, 20, 370, 141/372, 375, 376, 378, 383, 386

(56) References Cited

U.S. PATENT DOCUMENTS 3,136,344 A * 6/1964 Kollodge .................. 141/383
5,960,841 A * 10/1999 Green ....................... 141/383

* cited by examiner

Primary Examiner—Gregory L. Huson
Assistant Examiner—Peter deVore
(74) Attorney, Agent, or Firm—Christopher L. Parmelee; Walker & Jocke LPA

(57) ABSTRACT

A post valve yoke (35, 150) is operative to engage with a tank or cylinder (154) for placing the tank in fluid communication with a high pressure source of gas. The yoke includes a yoke body (148). The upper ends of the yoke body include a bore (160). A plunger (158) is operative to slide through the bore. The yoke body includes an opening (146) that is operative to receive a post valve (152) of the tank. The yoke is operative to urge the post valve with the plunger into sealed engagement with a passageway (144) in the lower end (174) of each yoke responsive to the movement of a lever arm (156) in pivoting connection with the plunger. A trigger lock (176) is operative to lock the lever arm in an engaged position to prevent the yoke from accidently disengaging with the post valve.

18 Claims, 7 Drawing Sheets

POST VALVE YOKE

CROSS REFERENCE TO RELATED APPLICATION

This Application claims benefit pursuant to 35 U.S.C. §119(e) of Provisional Application 60/198,978 filed Apr. 21, 2000.

TECHNICAL FIELD

This invention relates to post valve yoke connections. Specifically this invention relates to a system for quickly engaging and disengaging a yoke to a post valve of a tank for receiving a supply of compressed gas.

BACKGROUND ART

Yokes for mounting to post valves on tanks or cylinders of compressed gases are known in the art. Yokes provide a tank with a relatively safe connection to a pressurized supply of a gas for filling the tank. One example of a prior art yoke is the CGA 870 Yoke. This device is specifically designed to mount on a CGA 870 post valve of a tank to supplying oxygen gas for filling the tank. Such tanks are commonly used to supply the oxygen needs for medical devices. FIG. 1 shows an example of such a prior art yoke 310. The yoke 310 includes a yoke body 312 with an opening 316. The opening 316 is operative to accept a post valve 320 of a tank 318 therethrough. When the tank 318 is filled from a gas supply source, the pressures involved typically range between 2000 psi and 3000 psi. The yoke includes a passageway 328 through which gases may be supplied to the tank.

Prior art yokes include a hand wheel or a tee-bar 314. By applying a rotational force to the tee-bar 314 a threaded pin 322 rotates so as to urge the post valve into sealed engagement with the yoke. To facilitate proper alignment of the post valve 320 with the yoke 310, the yoke includes standardized index pins 324 which are operative to mate with corresponding holes in the post valve.

A typical tank can be mounted to a yoke, filled with a gas, such as oxygen, and dismounted from the yoke within several few minutes. Unfortunately the manual act of rotating the tee-bar for engaging and disengaging the yoke accounts for a significant portion of time to fill a tank. For large suppliers of compressed tanks of oxygen, a significant amount of the cost of labor to fill tanks is consumed by the prior art, manual operation of rotating each tee-bar a plurality of times to engage, and disengage yokes from post valves. Consequently, there exists a need for a system of engaging and disengaging a yoke to a tank which is faster and less time consuming. There further exists a need for system of connecting disconnecting multiple tanks at one time that is faster and less time consuming.

Prior art yoke post valves and the heads of tanks are manufactured with sizes and dimensions that conform to Compressed Gas Association (CGA), ANSI, and international standards. This enables a technician to mix and match yoke post valves from a plurality of different manufacturers with tanks from a plurality of different manufacturers of the same type. In this manner all CGA 870 Yokes will be compatible with all CGA 870 tanks, regardless of who manufactures them.

Unfortunately, in practice there are slight variations in tolerances between different yokes and tanks of the same type even by the same manufacturers. These variations are typically the result of the seals and gaskets between the post valves and the yoke which have small differences in dimension and size. These variations can range as high as 1/32 of an inch. With a prior art yoke, the tee-bar must be manually rotated by different amounts to compensate for these variations. Consequently there exists a need for a faster mechanism for engaging a yoke post valve to a tank that does not require manual adjustments to compensate for variations in sizes of seals, valves, and the yoke itself.

DISCLOSURE OF INVENTION

It is an object of the exemplary form of the present invention to provide an improved yoke for mounting to a post valve of a tank.

It is a further object of the exemplary form of the present invention to provide a yoke that is operative to quickly engage and disengage with a tank.

It is a further object of the exemplary form of the present invention to provide a system for engaging and disengaging a plurality of yokes to tanks.

It is a further object of the exemplary form of the present invention to provide a system for automating the engagement and disengagement a plurality of yokes to tanks.

It is a further object of the exemplary form of the present invention to provide a yoke that is operative to automatically compensate for differences in sealing tolerances between the post valve of a tank and the yoke.

Further objects of the present invention will be made apparent in the following Best Modes for Carrying Out Invention and the appended claims.

The foregoing objects are accomplished in one exemplary embodiment of the invention by a tank mounting system that is operative to hydraulically connect a plurality of tanks to a gas system. The system includes a rack which is operative to mount each tank to a corresponding yoke post valve. All of the yokes are in operative connection with a common passageway for directing gases through the system. The system further includes a hydraulic pump. Each of the yokes includes a hydraulic cylinder that is integral with the yoke. Each hydraulic cylinder is operative to urge the post valve of a tank into sealed engagement with the yoke responsive to hydraulic pressure. Each hydraulic cylinder is further operative to disengage the post valve of a tank with the yoke responsive to hydraulic pressure.

The hydraulic pump is operative to controllably supply the hydraulic pressure to each of the yokes. In the exemplary embodiment the hydraulic pump controls the hydraulic pressure responsive to a valve controlled flow of a pressurized supply of gas. In this described embodiment, the pressurized gasses are supplied by a shop air compressor. However, alternative embodiments may use any moderate pressure source of gases to operate the hydraulic pump.

By manipulating the flow of shop air to the hydraulic pump, the present invention enables an operator to simultaneously control the engagement and disengagement of a plurality of yokes to corresponding tank post valves. This described system significantly reduces the amount of labor and time that is necessary for connecting multiple tanks to a supply of pressurized gas such as oxygen.

In another exemplary embodiment of the present invention, the system may include a yoke that is manually engaged and disengaged from a post valve of a tank with a lever arm. The lever arm is operative to urge a plunger or pin toward the post valve for engaging the post valve to the yoke. Once engaged the lever arm includes a trigger locking mechanism for maintaining the yoke in an engaged position.

By releasing the trigger lock, the lever is operative to raise the plunger and disengage the tank from the yoke. Such a manual lever provides a much faster method of engaging and disengaging a yoke to a post valve of a tank than the prior art yoke described previously.

To compensate for variation in tolerances between the seals of the yoke and the post valve of the tank, this described embodiment of the lever operated yoke, includes a plunger which is automatically operative to adjust in height responsive to the variations in sizes of the seals. The plunger includes a retractable portion that is biased into an extended position by a plurality of internal compression spring washers. For thicker or thinner seals between the yoke and post valve, the compression spring washers are operative to compress to enable the retractable portion to retract a small amount. By retracting, the pin is operative to change in length responsive to the engaging forces caused by the larger seals.

The present exemplary invention enables a plurality of tanks to be filled much faster than prior art methods. In one exemplary system for filling tanks, multiple tanks are placed on a rack which includes either the hydraulic yokes and/or the manual lever operated yokes of the present invention. Each of the yokes on the rack are connected to a common passageway. The exemplary hydraulic yokes may be automatically engaged to a corresponding tank responsive to the operation of the hydraulic pump. The exemplary lever operated yokes are manually engaged to a corresponding tank by moving their respective lever arms to an engaged position.

To prepare each tank for filling, the post valve of each tank are manually opened so as to be in fluid communication with the common passageway. A vacuum source may then be placed in operative connection with the common passageway to remove any residual gases that may be present in the tanks.

To fill the tanks with a compressed gas, the passageway is placed in operative connection with a high pressure source of the gas. Once filled, the post valves may be closed, the gas pressure in the common passageway may be normalized with a bleeder, and the yokes disengaged from the tanks. The exemplary hydraulic yokes may be automatically disengaged responsive to operation of the hydraulic pump. The exemplary lever operated yokes may be manually disengaged by moving their respective lever arms to a disengaging position. Thus exemplary hydraulic and lever operated yokes of the present invention provide a safe and fast method of connecting individual and multiple pressurized tanks to a high pressure supply of a gas. Each of the exemplary embodiments are operative to provide a longitudinal force that moves a pin or plunger in a linear reciprocating motion. It is to be understood that a linear reciprocating motion is defined herein as a generally straight back and forth motion without the pin or plunger revolving about its axis.

BEST MODES FOR CARRYING OUT INVENTION

Figure 2:
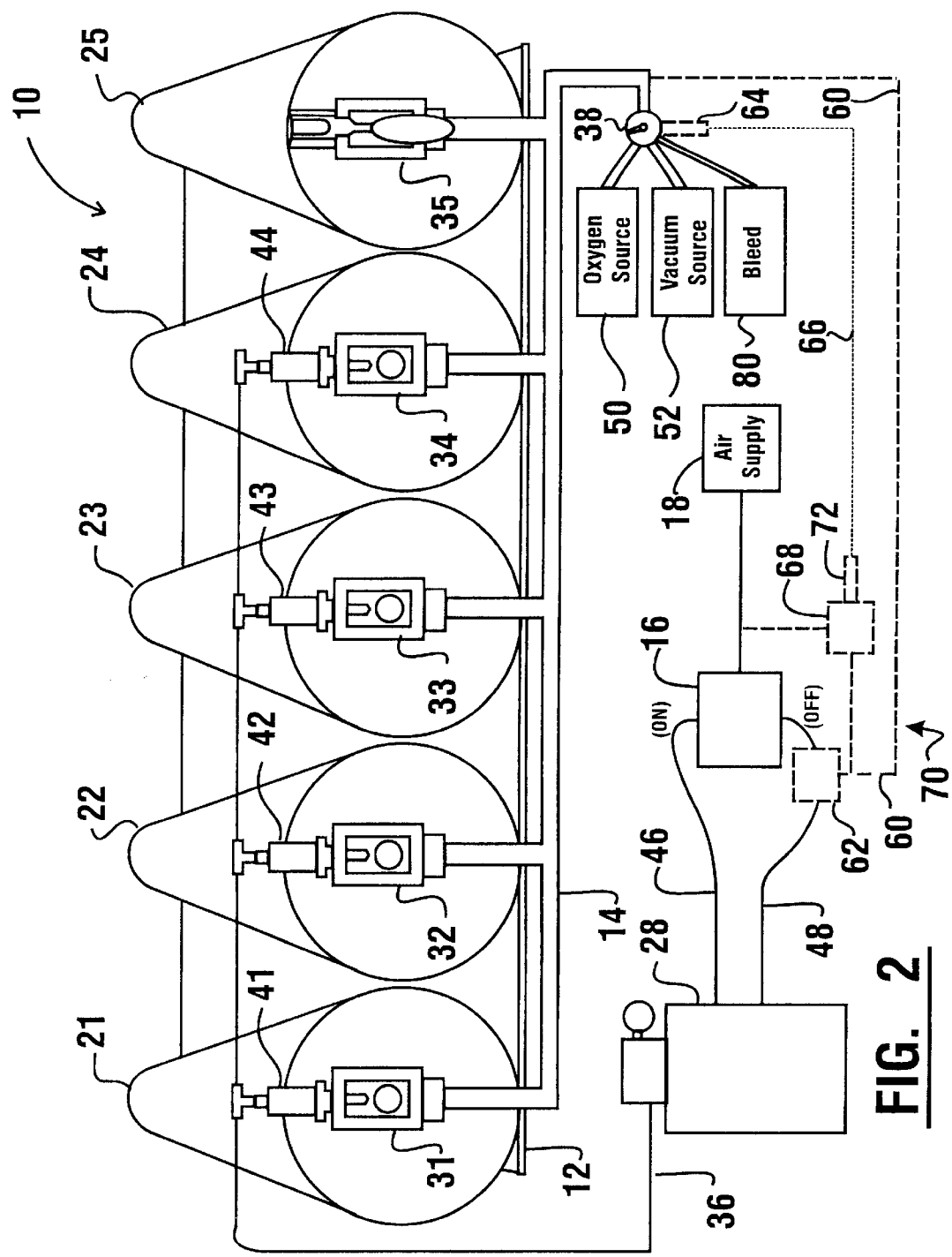
FIG. 2 is a schematic view representative of an exemplary embodiment of a yoke post valve mounting system for the present invention.

Referring now to the drawings and particularly to FIG. 2, there is shown therein, a schematic view representative of an exemplary embodiment of a post valve yoke mounting system 10 of the present invention. Here the system 10 includes a rack or mounting structure 12 that is operative to support a plurality of tanks or cylinders 21–25. These tanks are operative to store pressurized gases or other fluids, including such gases as oxygen, nitrogen, or any other type of compressible gas. In the exemplary embodiment these tanks conform to CGA-870 specifications for storage of Oxygen. However, alternative embodiments of the present invention may be adapted for use with CGA-880, CGA-890, CGA-910, CGA-930, CGA-940, CGA-950, CGA0960, CGA-973 tanks or any other type gas or fluid storage container.

The system 10 further includes a plurality of yoke post valves 31–35 which are in fluid communication with a common passageway 14. Each of the yoke post valves 31–35 are operative to engage with one of the tanks 31–35 to transfer gases between the tanks and the common passageway 14. In the exemplary embodiment these yokes 31–35 are adapted to accept and engage with a CGA-870 tank. However, alternative embodiments of the exemplary yokes of the present invention may be adapted to engage with any of the previously listed CGA tanks or any other type of gas or fluid storage container.

The common passageway 14 is in operative connection with at least one source valve 38. The source valve 38 is operative to place the common passageway in fluid communication with either a high pressure source of a gas 50 or a vacuum source 52. In the exemplary embodiment the high pressure source 50 is operative to supply gases such as oxygen to the tanks 21–25. However, in alternative embodiments the high pressure source may provide other pressurized gases and fluids to the system 10 including carbon dioxide, helium, nitrous oxide, medical air, nitrogen, and mixtures of these gases.

FDA "Good Manufacturing Practices" require a vacuum to clean out air, moisture, and any residual gas to maintain purity and maintain an unadulterated drug product such as compressed medical gasses. Consequently to ensure that the contents of the tanks are not contaminated, the vacuum source 52 may be placed in fluid communication with the common passageway 14. The vacuum source 52 is operative to remove air, moisture, and residual gases from the tanks 21–25 which may have accumulated in the empty tanks prior to being filled.

In one exemplary embodiment system 10 further includes a hydraulic pump 28 that is in fluid communication with one or more of the yokes through a hydraulic line 36. The hydraulic pump 28 is operative to control the pressure of hydraulic fluid between the hydraulic pump 28 and the yokes 31–34. Each of the yokes 31–34 include a hydraulic cylinder 41–44. The hydraulic cylinders are operative responsive to the pressure of the hydraulic fluid to urge the tanks into engagement with the yokes 31–34. When engaged a high pressure seal is provided between the tanks and yokes. The hydraulic cylinders 41–44 are also operative responsive to the pressure of the hydraulic fluid to disengage the tanks 21–24 from the yoke 31–34.

In the exemplary embodiment of the present invention, the hydraulic pump 28 is pneumatically operated with a moderate pressure gas supply 18. In the exemplary embodiment the gas supply 18 is provided by a shop air compressor; however alternative embodiments of the present invention may use other sources of moderate pressure air or other inert gases to operate the hydraulic pump 28.

In the exemplary embodiment, the tanks 21–25 are filled with oxygen. Because oxygen is extremely reactive with other materials, precautionary measures must be taken to ensure the safety of the operators of the system. Consequently the exemplary embodiment of the present invention includes a hydraulic fluid that is water soluble, fire resistant, and non-reactive with oxygen. One example of an exemplary hydraulic fluid operative for use with the system 10 includes Renosafe C-46, Water Glycol Fire Resistant Hydraulic Fluid supplied by Jergens Industrial Supply (Fuchs Lubricants Co.)

The system 10 includes a directional valve 16 that is operative to selectively direct the flow of moderate pressurized gases such as air from an air supply 18 to the hydraulic pump 28. The hydraulic pump 28 is operative responsive to the flow of pressurized air from the direction valve 16 to control the pressure of the hydraulic fluid between the hydraulic pump 28 and the hydraulic cylinders 41–44. Two gas lines 46 and 48 controlled by the directional valve 16 are operative to input gas pressure to and release gas pressure from the hydraulic pump 28.

When the directional valve 16 is placed in a first position, air pressure is directed through the first gas line 46 to the hydraulic pump 28. The hydraulic pump 28 is operative responsive to the air pressure at the first gas line 46 to provide sufficient hydraulic pressure to engage the tanks 21–24 with their respective yokes 31–34. In one exemplary embodiment, the hydraulic pump acts as 30:1 booster and is operative to output hydraulic pressure which is 30 times the pressure of the air supply 18.

When the directional valve is placed in a second position, the directional valve is operative to remove the pressurized air supply 18 from the first gas line 46 and is operative to exhaust air from the second gas line 48. The hydraulic pump 28 is operative responsive to the absence of the pressure of the air supply 18 and the exhausting of air through the second gas line 48 to hydraulically disengage the tanks 21–24 from their respective yokes 31–34. In alternative exemplary embodiments other configurations of hydraulic pumps, valves, pressurized gas supplies, and piping may be used to operatively control the hydraulic pressure output of the hydraulic pump.

In the exemplary embodiment, once the tanks 21–24 have been filled with oxygen, the oxygen source 50 may be removed from the system by the source valve 38, and the tanks may be manually closed. To reduce the high pressure within in the passageway 14 prior to disengaging the tanks from the yokes, the exemplary embodiment of the present invention further includes a bleeder 80. The bleeder 80 is in operative fluid communication with the directional valve 38 and/or the passageway 14 of the system. After the tanks have been closed and the oxygen source has been removed from the system, the bleeder may be used to normalize the gas pressure within the passageway 14 with outside air pressure.

Exemplary embodiments of the present invention may further include a safety control device 70 integrated with the hydraulic pump and/or directional valve to prevent unclamping of the hydraulic yokes 31–34 when the tanks 21–24 are being filled and the system is pressurized. FIG. 2 shows an example of two exemplary embodiments of the safety control device 70. The first embodiment includes piping 60 which enables the high pressure oxygen source 50 to pass through pipping 60 to close the safety valve 62. The safety valve 62 is operative responsive to the high pressure oxygen source 50 to prevent gas from being exhausted from the second gas line 48 when the passageway 14 is under pressurized and the directional valve 16 is accidentally placed in the second position.

An exemplary second embodiment of the safety control device is also shown in FIG. 2. As with the first exemplary embodiment of the safety control device, the second exemplary embodiment includes the safety valve 62 between the directional valve 16 and the second gas line 48 of the hydraulic pump 28. However in this exemplary embodiment the safety valve is in fluid communication with a control valve 68. The control valve 68 is operative to place the safety valve in fluid communication with the air supply 18 responsive to the detection of the system being pressurized by the oxygen source 50. In this exemplary embodiment, the control valve 68 is activated by an electronic solenoid 72 which is in electronic connection with an electronic solenoid 64 in operative connection with the source valve 38. When the source valve 38 opens the oxygen source to the passageway 14, the second solenoid 72 is operative to send the first solenoid an electrical signal which causes the first solenoid to open the control valve 68. As a result of the control valve 68 opening, the safety valve closes and prevents the directional valve 16 from accidentally exhausting the second gas line 48 and thereby releasing the clamp of the yokes on the tanks when the system is pressurized.

Figure 3:
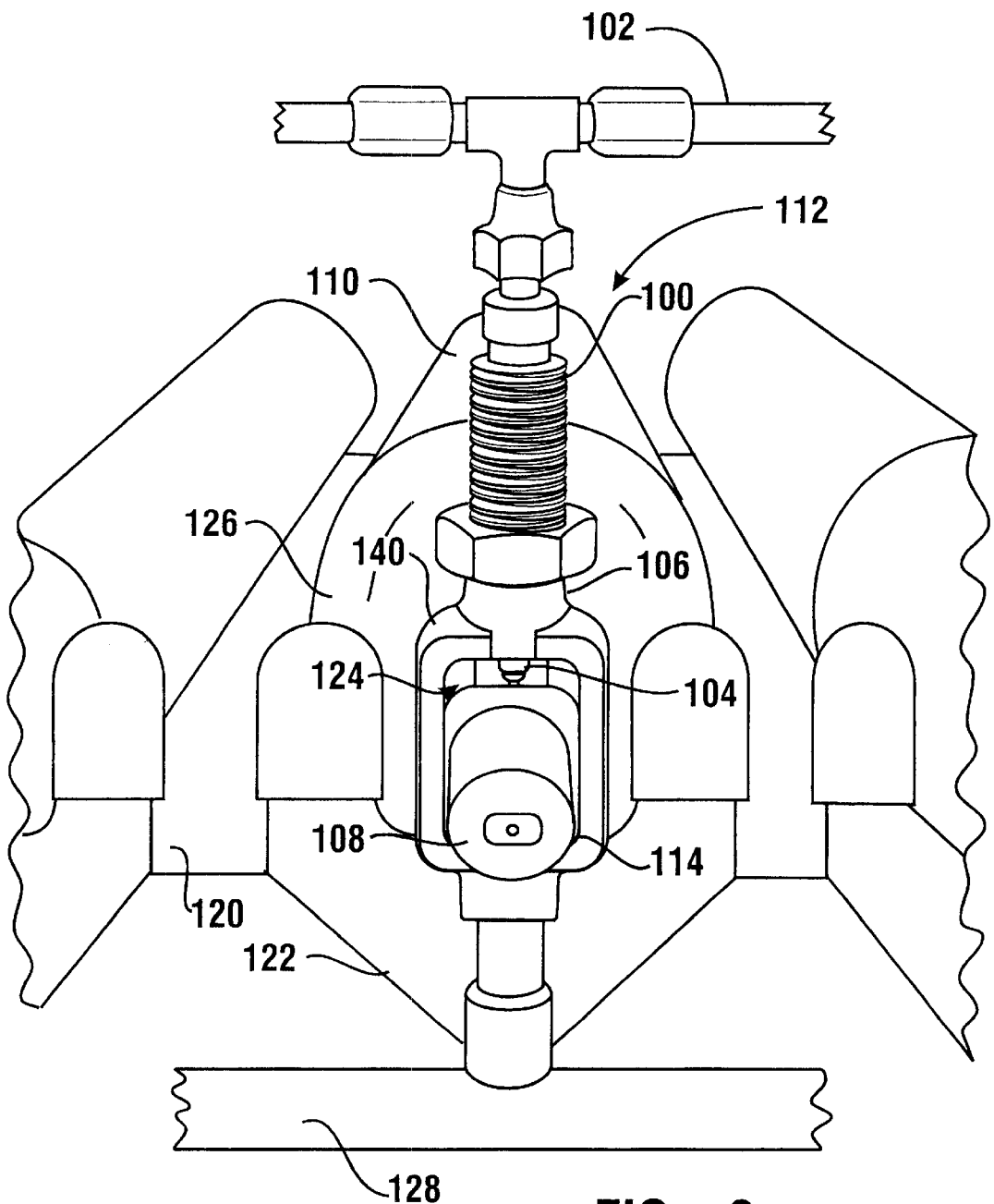
FIG. 3 is a perspective view representative of an exemplary embodiment of a hydraulically controlled yoke post valve for the present invention.

FIG. 3 is representative of a perspective view of a hydraulically operated yoke 112. In the exemplary embodiment the yoke 112 is in operative connection with a rack 120. The rack 120 is operative to support at least one tank in an angled position with its respective post valve 108 directed downwardly through an opening 124 in the yoke body 140. The rack further includes a plurality of front guides 122, that are operative to support the front 126 of a tank As discussed previously the exemplary hydraulic yoke 112 of the present invention includes a hydraulic cylinder 100. The hydraulic cylinder is in operative connection with a first end 106 of the yoke body 140. The hydraulic cylinder 100 is also in operative connection with a supply of hydraulic fluid through a hydraulic line 102. The hydraulic cylinder 100 is operative responsive to the pressure of hydraulic fluid to move a pin 104 through the first end 106 of the yoke. As the pin is moved downward into an extended position, the pin 104 is operative to urge the post valve 108 of the tank 110 into sealed engagement with a passageway in the opposed second end 114 of the yoke body 140. To disengage the post valve 108 from the yoke, the hydraulic cylinder is operative to retract the pin 104 responsive to the pressure of the hydraulic fluid.

When the post valve 108 is engaged with the yoke, the post valve 108 can be opened with a wrench for example to place the tank in fluid connection with a common passage way 128. This common passageway as discussed previously may be selectively connected to a vacuum source to remove residual gases and may be connected to a high pressure oxygen source to fill the tank with oxygen.

Figure 4:
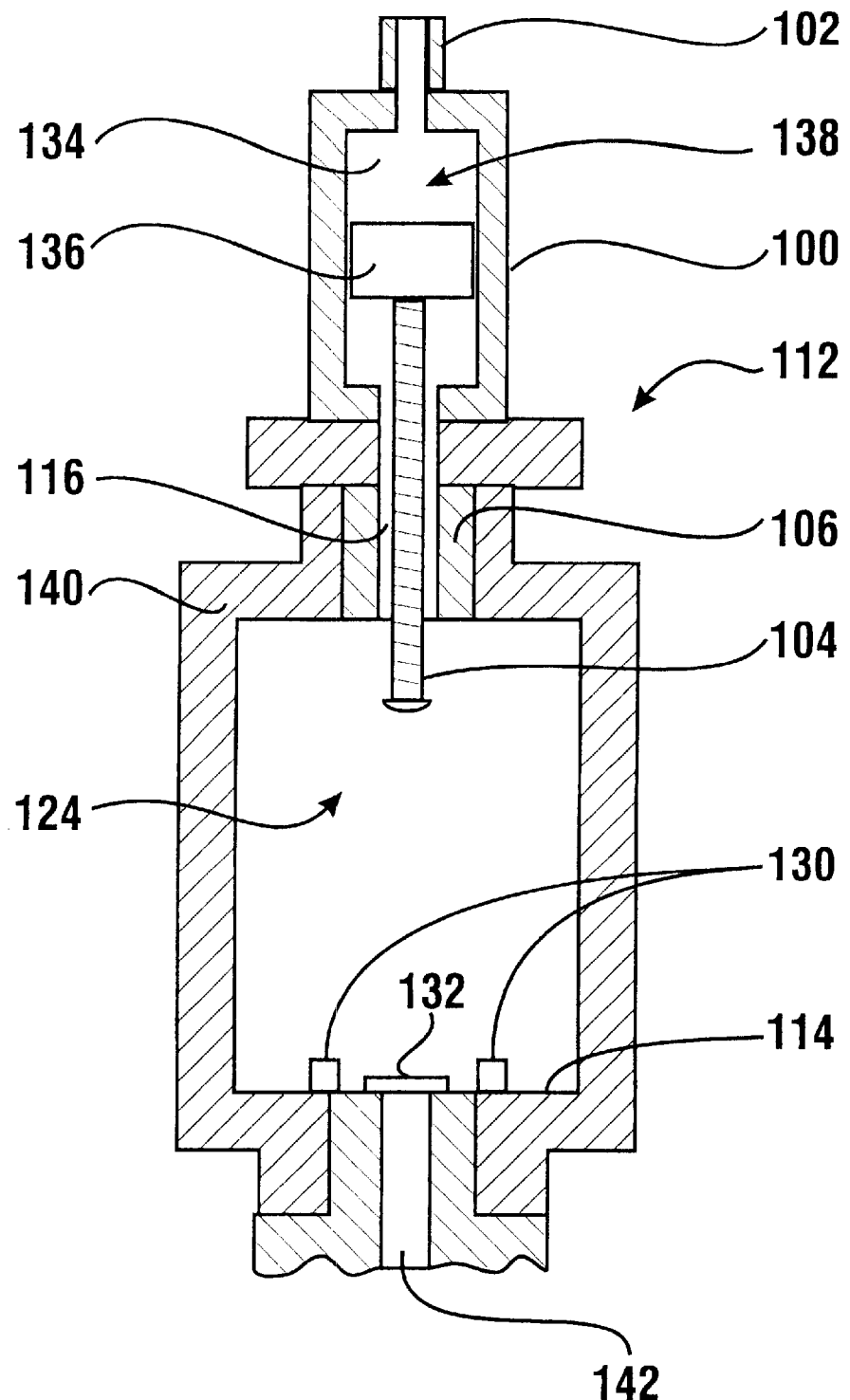
FIG. 4 is a side view representative of an exemplary embodiment of the hydraulically controlled yoke post valve for the present invention.

FIG. 4 shows a side cross-section view of the hydraulic yoke 112. The hydraulic yoke includes standardized index pins 130 for facilitating alignment of a compatible post valve to the yoke 112. The yoke 112 further includes a passageway 142 in the second end 114 of the yoke body. A gasket 132 located adjacent the passageway 142 provides a high pressure seal when the post valve is engaged with the passageway 142 of the yoke. The upper end 106 of the yoke body 140 includes a bore 116 which intersects with the opening 124. The pin 104 is in operative sliding connection with the bore 116.

The hydraulic cylinder 100 includes a piston 136 that is operative to reciprocate within a chamber 134 of the hydraulic cylinder. The pin 104 is in operative connection with the piston 136 and moves through the bore 116 responsive to the movement of the piston 136. As the piston moves down in response to hydraulic pressure in the upper portion 138 of the chamber, the pin moves into an extended position within the opening 124. As the piston 136 moves up in response to hydraulic pressure in the upper portion 138 of the chamber, the pin retracts.

The described embodiment of the present invention provides a fast and automatic system for engaging a plurality of tanks to their respective yokes. Even though each pin may need to extend downward from the hydraulic cylinders by differing amounts depending on the differences in tolerances and seal sizes of the yokes and tanks, the present exemplary embodiment is operative to provide sufficient hydraulic pressure to move each pin a sufficient distance to create a high pressure seal between each of the yokes and tanks in the system.

Figure 1:
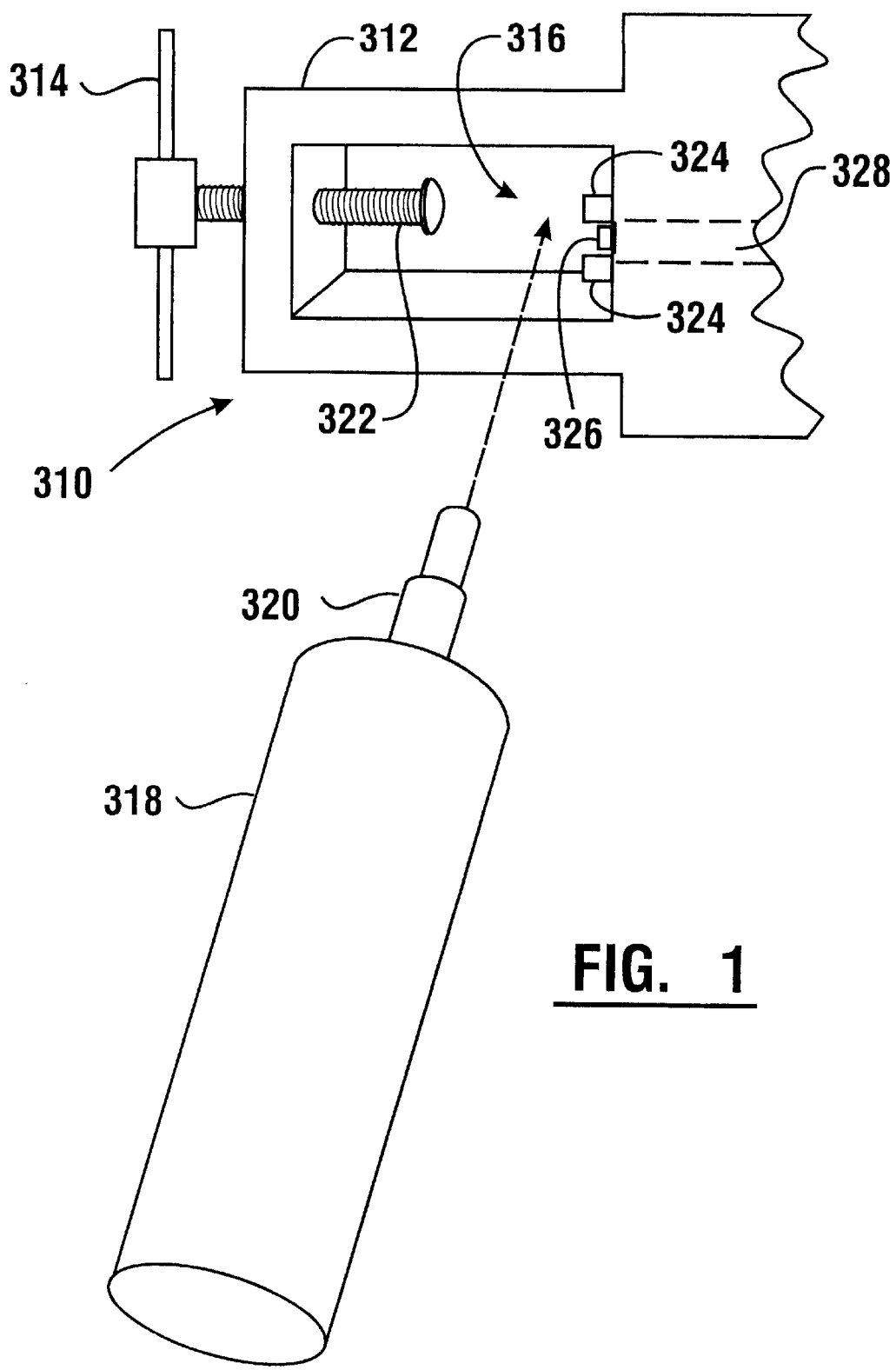
FIG. 1 is a front perspective view representative of a prior art yoke post valve.
Figure 5:
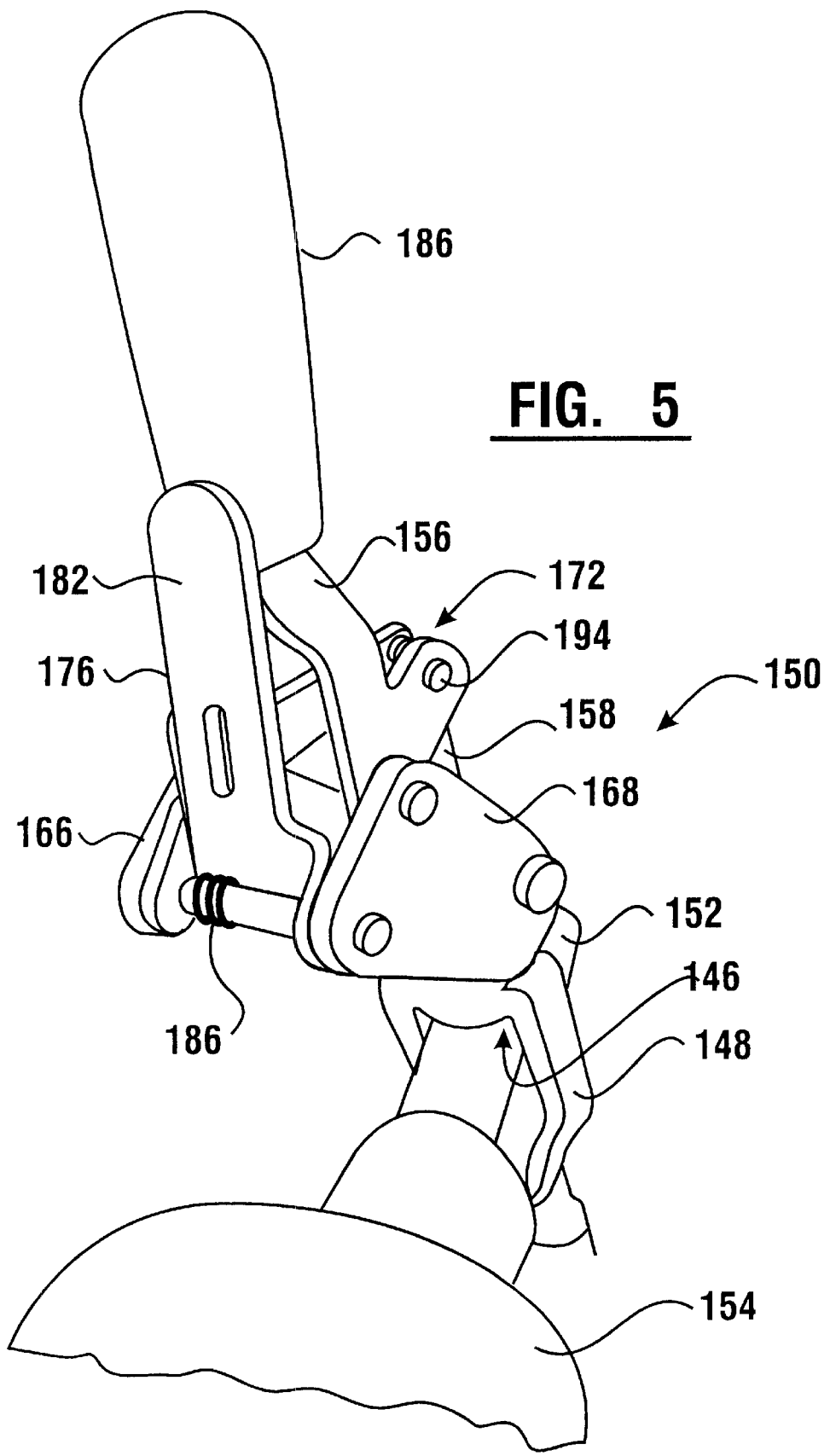
FIG. 5 is a perspective view representative of an exemplary embodiment of a lever operated yoke post valve for the present invention.

As shown in FIG. 1 a further exemplary embodiment of the present invention may include an alternative yoke 35 that is lever operated. FIG. 5 is representative of a perspective view of the exemplary alternative lever operated yoke 150 of the present invention. As with the hydraulic yoke described previously, the lever operated yoke 150 includes a yoke body 148 with an opening 146 that is operative to receive a post valve 152 of a tank 154 therethrough. The yoke body 148 is operative to engage with a post valve of a tank by having a pin or plunger urge the post valve into sealed engagement with a passageway of the yoke. However, unlike the hydraulic embodiment, the lever operated yoke 150 is not activated by using hydraulic pressure, but requires the manual movement of the lever arm 156 between a disengaged position and an engaged position.

Figure 6:
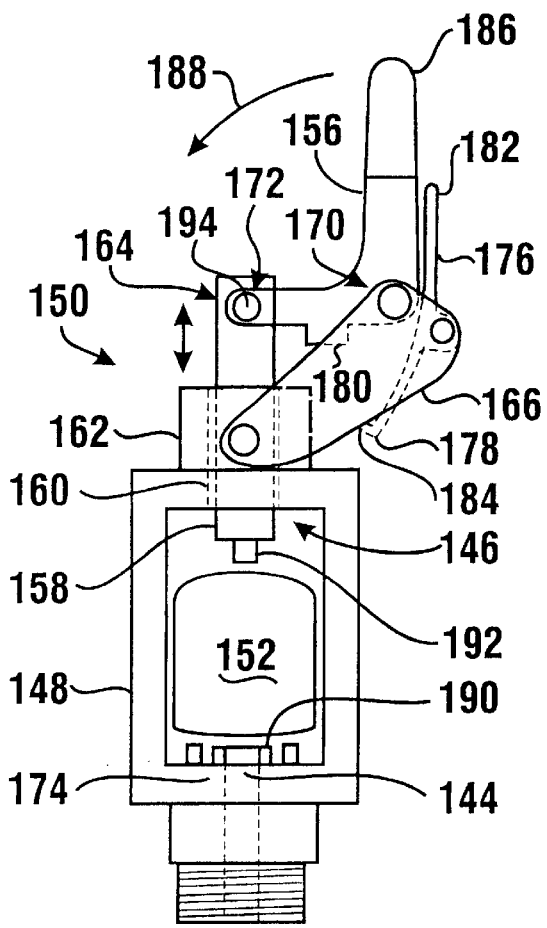
FIG. 6 is a side view representative of an exemplary embodiment of the lever operated yoke post valve in a disengaged position.

FIG. 6 is representative of a side view of one exemplary embodiment of the lever operated yoke 150 in a disengaged position. The yoke includes a pin or plunger 158 that is operative to reciprocate within a bore 160 in a first end 162 of the yoke body. The yoke further includes a lever arm 156 with a first end portion 172 and a second end portion 170. The first end portion 172 of the lever arm is in pivoting connection with the first end portion 164 of the plunger 158.

In the exemplary embodiment the lever arm 156 includes a handle 186 that is in operative connection with the second end portion 170 of the lever arm to provide the lever arm with an L-shape. Although the exemplary lever arm 156 has an L-shape configuration, alternative exemplary embodiments may have other shapes and configuration including a lever arm with a relatively straight configuration. The lever arm 156 is sandwiched between two cross members 166 and 168. Each of the cross members 166 and 168 include a first end portion that is in pivoting connection with the first end portion 162 of the yoke. In addition each of the cross members 166 and 168 include a second end portion that is in pivoting connection with the second end portion 170 of the lever arm.

Figure 7:
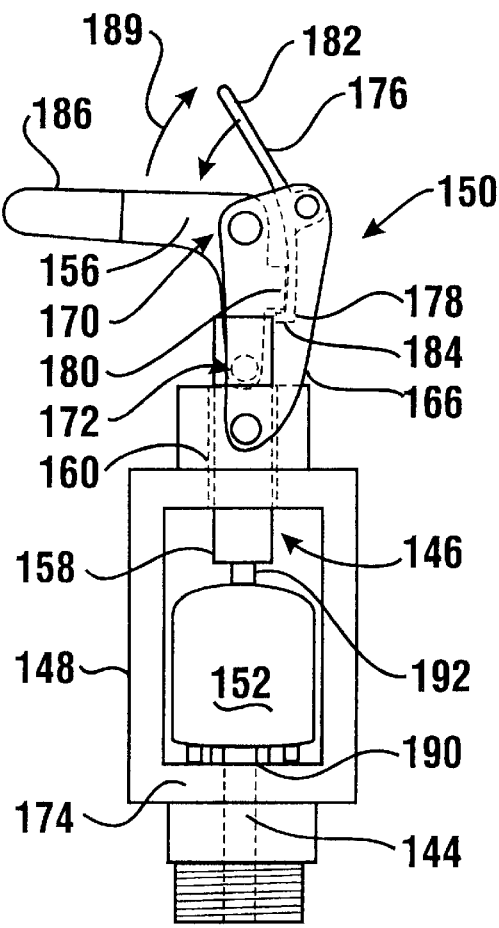
FIG. 7 is a side view representative of an exemplary embodiment of the lever operated yoke post valve in an engaged position.

In the exemplary embodiment, the yoke is operative to engage with the post valve 152, by moving the lever arm 156 in a first direction 188. This movement of the lever arm causes the plunger 158 to move downwardly and urge the post valve 152 into sealed engagement with a passageway 144 in the second end 174 of the yoke. FIG. 7 shows the yoke 150 in the engaged position.

The yoke 150 further includes a trigger lock 176 in pivoting connection with the cross members 166 and 168. The trigger lock includes a first end 178 and a second end 182. The first end includes a hooked portion 184 that is biased to move adjacent an extending portion 180 of the lever arm 156 when the yoke is in the engaged position. In the exemplary embodiment, the trigger lock 176 is biased with a coil spring 186. When the hooked portion 184 is adjacent the extending portion 180 of the lever arm 156, the lever arm is prevented from moving to the disengaged position. The trigger lock is operative to prevent the yoke 150 from accidentally disengaging while the tank is being filled with a high pressure source of oxygen.

By depressing the second end 182 of the trigger lock 176 toward the lever arm 156, the hooked portion 184 of the first end is operative to pivot away from the extending portion 180. This enables the lever arm 156 to be manually moved in a second direction 189 which places the yoke 150 back into the disengaged position as shown in FIG. 6.

As with the hydraulic embodiment of the yoke, the lever operated yoke is operative to automatically compensate for differences in tolerances and sizes of gaskets 190 between the post valve 152 and the base of the yoke 174. In the exemplary embodiment of the lever operated yoke, the plunger 158 includes a retractable portion 192 that is operative to extend from the plunger 158 with different lengths responsive to variations in tolerances and the sizes of gaskets 190 when the post valve 152 is engaged with the yoke.

Figure 8:
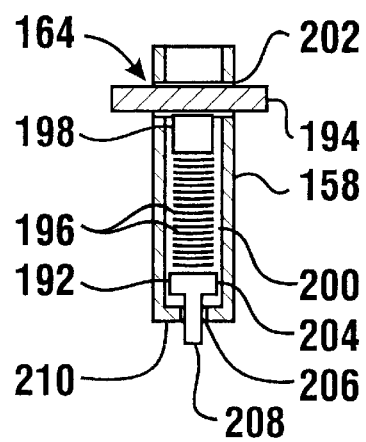
FIG. 8 is a cross sectional side view representative of an exemplary embodiment of a tolerance compensating plunger for the present invention.

FIG. 8 is representative of a cross-sectional side view of the plunger 158. The plunger 158 includes an internal axial bore 200 and an opening 206 in the lower end portion 210 of the plunger 158. The retractable portion 192 is in sliding connection with the bore 200. The retractable portion 192 includes an upper portion 204 and a tip portion 208. The tip portion 208 is operative to extend out the opening 206. The upper portion 204 has a larger diameter relative to the diameters of the tip portion 208 and the opening 206 to prevent the retractable portion 192 from sliding out of the plunger.

The upper end portion 164 of the plunger includes a second bore 202 which intersects with the internal axial bore 200. The second bore accepts a pivot pin 194 therethrough which provides the pivoting connection between the plunger 158 and the first end portion 172 of the lever arm 156.

In the exemplary embodiment the plunger 158 includes a plurality of compression spring washers such as belleville springs 196 between the pivot pin 194 and the retractable portion 192. The compression spring washers 196 urge the retractable portion 192 to an extended position. When the yoke 150 is engaged with a post valve 152 with relatively small gaskets, the retractable portion 192 in its maximum extended position has a sufficient length to urge the post valve into a high pressure seal with the yoke. In addition the compression spring washers 196 are operative to exert sufficient force on the retractable portion 192 to maintain the high pressure seal between the yoke and post valve when a 2000 psi to 3000 psi source of gas is used to fill the tank.

When the gaskets between the yoke and the post valve are relatively thicker, the compression spring washers 196 are operative to compress a sufficient amount to enable the lever arm 156 to reach its engaged position, while exerting sufficient force on the retractable portion 192 to maintain a higher pressure seal between the yoke and post valve. In the exemplary embodiment there are a sufficient number of compression spring washers in serial relation to enable the tip to recede into the plunger by about $\frac{1}{32}$ of an inch. The extra amount of space between the compression washers 196 and the pivot pin 194 is filled with a spacer plug 198.

Figure 9:
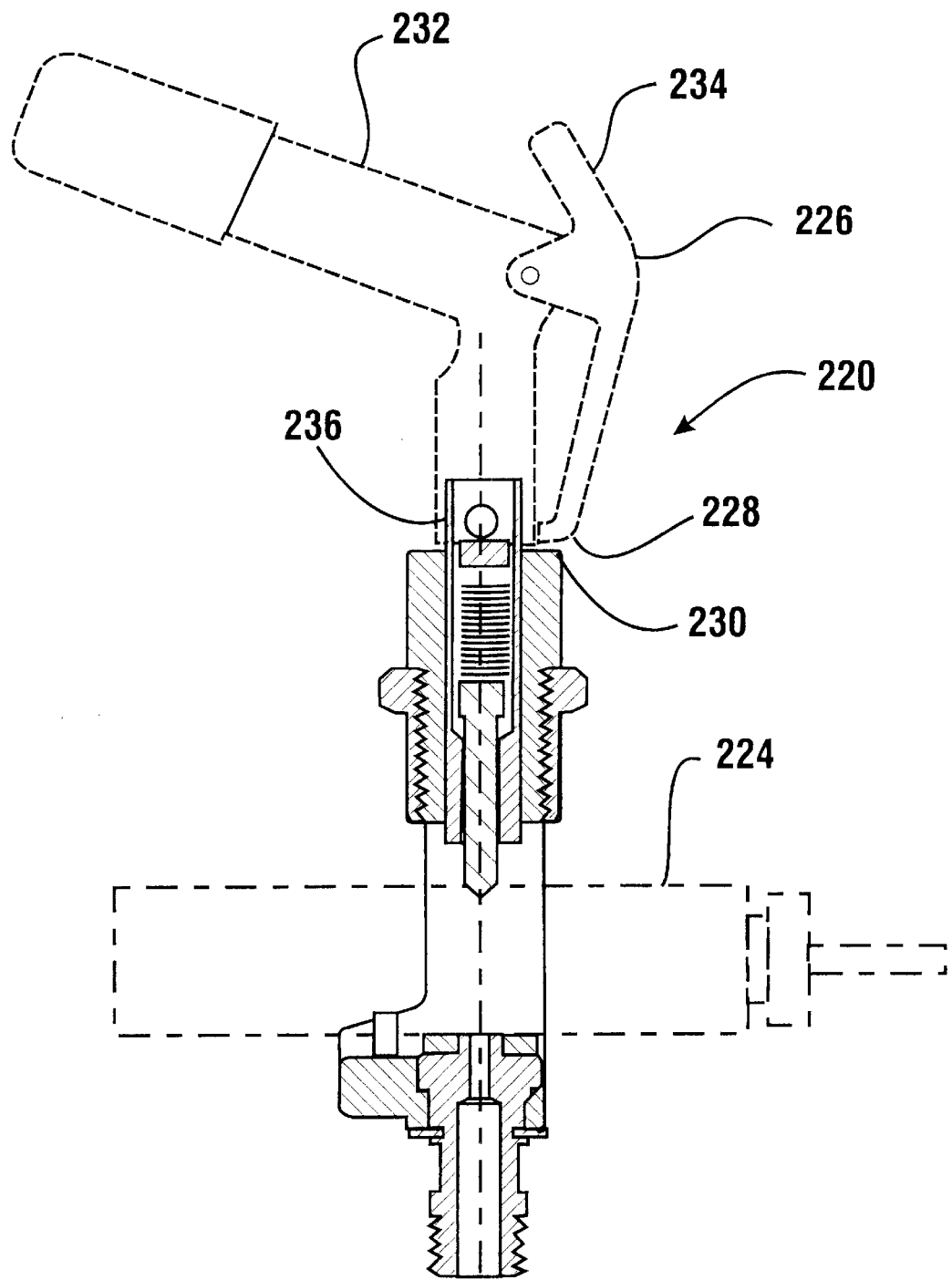
FIG. 9 is a cross sectional side view representative of an alternative exemplary embodiment of the lever operated yoke post valve.

FIG. 9 shows an cross-sectional view of an alternative exemplary embodiment of the lever operated post valve yoke 220. Here the yoke 220 is shown engaged to a tank 224. In this exemplary embodiment the first end 228 of the trigger lock 226 is urged adjacent to an upper surface 230 of the yoke body. In this locked position, the lever arm 232 is prevented from moving to a disengaged position. By depressing the second end of the 234 of the trigger lock, the first end 228 rotates away from the upper surface 230. This enables the lever arm 232 to rotate and the plunger 236 to move upwardly to disengage the tank 224.

Thus the post valve yoke mounting system of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A post valve yoke comprising:
   a yoke body, wherein the yoke body includes an opening for receiving a post valve of a tank therethrough, wherein a first end of the yoke body includes a bore that intersects with the opening, wherein a second end of the yoke body opposed from the first end of the yoke body includes a passageway, wherein the passageway is operative to receive a high pressure supply of compressed gas therethrough;
   a plunger in reciprocating connection with the yoke body, wherein the plunger is operative to extend through the bore and into the opening; and
   a lever arm in pivoting connection with a first end of the plunger, wherein the lever arm is operative to move between a first position and a second position, wherein when the lever arm moves from the first position to the second position, the lever arm is operative to urge the post valve with the plunger into sealed engagement with the passageway, and wherein when the lever arm moves from the second position to the first position, the lever arm is operative to retract the plunger and release the post valve from sealed engagement with the passageway.

2. The lever operated post valve yoke according to claim 1, further comprising:
   a cross member, wherein the cross member includes a first end and a second end, wherein the first end of the cross member is in pivoting connection with the first end of the yoke body, wherein the lever arm includes a first end, and a second end, wherein the first end of the lever arm is in pivoting connection with the first end of the plunger, wherein the second end of the lever arm is pivoting connection with the second end of the cross member.

3. The post valve yoke according to claim 2, wherein the lever arm includes an integral handle.

4. The post valve yoke according to claim 2, further comprising a trigger lock in pivoting connection with the cross arm, wherein when the lever arm is in the second position, the trigger lock is operative to prevent the lever arm from moving to the first position.

5. The post valve yoke according to claim 4, wherein the trigger lock includes a hook portion, wherein the lever arm includes an extending portion, wherein when the lever arm is in the second position, the trigger lock is biased to pivot the hooked portion adjacent the extending portion.

6. The post valve yoke according to claim 2, further comprising a trigger lock in pivoting connection with the cross arm, wherein when the lever arm is in the second position, a first end of the trigger lock is urged into a locking position adjacent an upper surface of the yoke body.

7. The post valve yoke according to claim 1, further comprising a trigger lock in pivoting connection with the post valve yoke, wherein when the lever arm is in the second position, a first end of the trigger lock is urged into a position which prevents the lever arm from moving to the first position.

8. The post valve yoke according to claim 1, wherein the plunger includes a retractable portion, wherein the retractable portion is biased into an extended position, wherein when the lever arm is moved into the second position, the retractable portion is operative to retract responsive to the forces required to urge the post valve into sealing engagement with the passageway.

9. The post valve yoke according to claim 8, wherein the plunger includes a plurality of compression spring washers, wherein the compression spring washers are operative to urge the retractable portion into the extended position.

10. The post valve yoke according to claim 9, wherein the plunger includes an axial bore adapted to hold the compression spring washers therein, wherein the plunger includes an opening to the axial bore in a lower end of the plunger, wherein the retractable portion is in sliding connection with the axial bore, wherein the retractable portion includes an upper portion and a tip portion, wherein the diameter of the upper portion is larger than the diameter of the opening to the axial bore in the lower end of the plunger, wherein the compression spring washers are operative to urge the tip portion into an extended position through the opening to the axial bore in the lower wend of the plunger.

11. The post valve yoke according to claim 1, wherein the yoke body includes index pins which are operative to align the post valve of the tank with the yoke body.

12. The post valve yoke according to claim 11, wherein the index pins are adapted to engage with a CGA-870 Tank.

13. A post valve yoke comprising:
- a yoke body, wherein the yoke body includes an opening for receiving a post valve of a tank therethrough, wherein a first end of the yoke body includes a bore that intersects with the opening, wherein a second end of the yoke body opposed from the first end of the yoke body includes a passageway, wherein the passageway is operative to receive a high pressure supply of compressed gas therethrough; and
- a means for providing a longitudinal force in operative connection with the yoke body, wherein the longitudinal force means includes a pin, wherein the longitudinal force means is operative to move the pin in a linear reciprocating motion through the bore and opening, wherein the longitudinal force means is operative to urge with the pin a post valve of a tank into sealed engagement with the passageway, wherein the longitudinal force means is further operative to release the post valve from sealed engagement with the passageway.

14. The post valve yoke according to claim 13, wherein the longitudinal force means is operative to automatically adjust the amount of extension of the pin in the opening when creating a high pressure seal between the yoke body and the tank, whereby the yoke is operative to automatically compensate for variations in tolerances between the yoke body and the tank.

15. The post valve yoke according to claim 14, wherein the longitudinal force means includes a lever arm.

16. The post valve yoke according to claim 15, wherein the lever arm is in pivoting connection with the pin and the yoke body.

17. The post valve yoke according to claim 15, wherein the longitudinal force means includes a plurality of compression spring washers which are operative to compress responsive to variations in tolerances between the yoke body and the tank.

18. The post valve yoke according to claim 13, wherein the yoke body includes index pins which are adapted to engage with the post valve of a CGA-870 Tank.

* * * * *